United States Patent [19]

Bobrowicz et al.

[11] 3,739,157

[45] June 12, 1973

[54] METHOD FOR PREPARING PROGRAM MEDIUM FOR MULTIPLE CONTROLLED ELEMENT MACHINE

[75] Inventors: Vincent F. Bobrowicz, Livonia; John E. Stevenson, Dearborn Heights, both of Mich.

[73] Assignee: The Bendix Corporation, Southfield, Mich.

[22] Filed: Sept. 30, 1970

[21] Appl. No.: 76,934

[52] U.S. Cl............ 235/151.11, 90/13 C, 318/568, 340/172.5
[51] Int. Cl. ........................................... G06f 15/46
[58] Field of Search .............. 235/151.11; 318/562, 318/567–569, 574; 340/172.5; 234/94–95; 83/574, 618, 622; 90/13 C

[56] References Cited
UNITED STATES PATENTS

| | | | |
|---|---|---|---|
| 3,439,346 | 4/1969 | McGee | 235/151.11 X |
| 3,274,553 | 9/1966 | Yuichiro Oya | 318/574 X |
| 3,297,929 | 1/1967 | Gardner et al. | 235/151.11 X |
| 3,372,568 | 3/1968 | Lemelson | 318/562 X |

OTHER PUBLICATIONS

"Automatically Programmed Tool: Simplifies the Man–Machine Communication Problem," Control Engineering, April 1959, pp. 21–26.

Primary Examiner—Eugene G. Botz
Assistant Examiner—Jerry Smith
Attorney—Ethington, McGlynn, & Reising and Milton, William F. Thornton and Plante, Hartz, Smith and Thompson

[57] ABSTRACT

A method for preparing a program tape for simultaneously controlling both heads of a two-head machine, the head path segments being placed on the tape in order of absolute time at completion.

6 Claims, 3 Drawing Figures

METHOD FOR PREPARING PROGRAM MEDIUM FOR MULTIPLE CONTROLLED ELEMENT MACHINE

This invention relates to the preparation of a program medium bearing data for the numerical control of machines having multiple-controlled elements.

It is often desirable to perform two or more operations on a single workpiece simultaneously; for example, a boring or milling machine having two cutters, each displaceable independently along two axes, may be employed to perform simultaneously and in a synchronized fashion vertical and horizontal cutting operations. A numerical control system for such a machine preferably employs a single program medium containing merged or interleaved data for the control of each cutter since to employ two separate program reading arrangements would be uneconomical and would be likely to result in a loss of synchronization. The major problem in arranging data for the control of the two heads on a single medium, such as punched tape, arises out of the fact that the data is arranged in blocks and it is desirable to minimize the number of such blocks to minimize the program length. It frequently occurs that the two prescribed paths of displacement are quite dissimilar, one path requiring a substantial number of individual path segments and the other requiring relatively few individual path segments. To merge the data for these two types of displacement normally results in the requirement for an inordinate number of program blocks since each block for the multiple segment path also requires the presence of a block for a parallel segment of the other path even though the other path would not normally require a separate block at that point. The result is a control tape of inordinate length, this tape being difficult and expensive to prepare as well as to use.

In accordance with the present invention, a method is presented for the preparation of a program for the simultaneous control of the movable elements of a plural controlled element machine from program data defining the desired movements of each element in independent form. Moreover, the present invention provides for the minimization of the number of control program blocks along with the synchronization of element movements by the order in which individual path segments are selected for arrangement on or in the program storage medium. In general, this is accomplished by processing the path segments for each movable element to determine the total absolute time required for the execution of each path segment on a prescribed machine. The path segments for the two elements are then merged onto a single program medium by selecting path segments in the order of absolute time of execution.

The inventive method as well as the various features and advantages thereof will be best understood from a reading of the following specification which sets forth a specific example of the use of the subject method in detail, this specification to be taken with the accompanying drawings of which:

Figure 1:
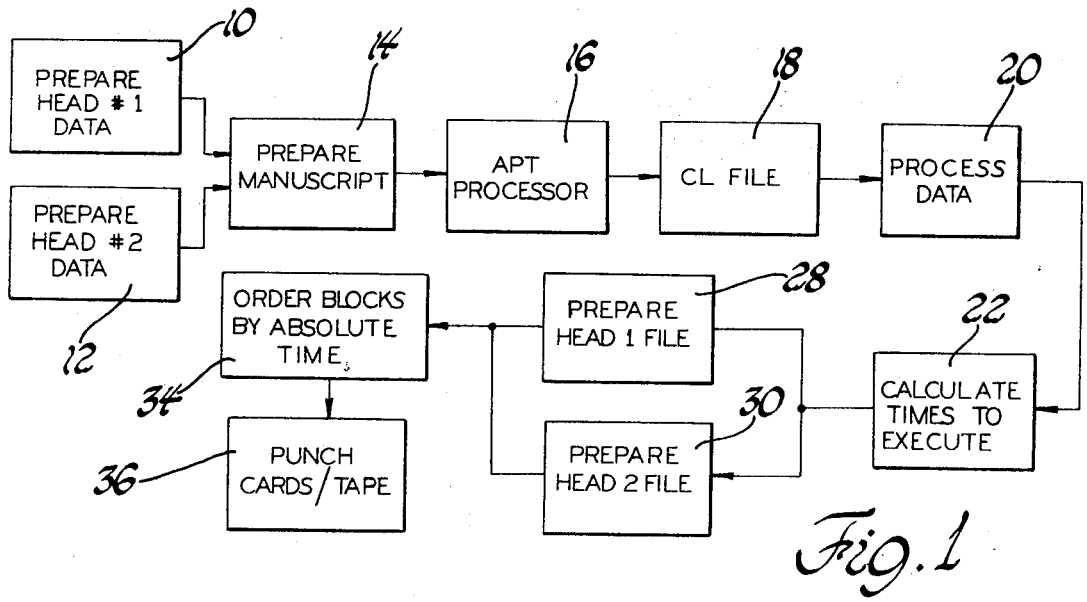
FIG. 1 is a block diagram of apparatus and process steps for carrying out the subject method.

Referring now to FIG. 1, there is shown in block diagram a method for preparing a punched tape or other suitable medium for the control of both heads of a two-head, two-axis per head milling machine of the type set forth in the copending application Ser. No. 27,494 Filed on or about Apr. 13, 1970 in the name of George H. McDaniel and Assigned to the Bendix Corporation. In such a machine, a first cutter head is adapted to be displaced along each of two mutually perpendicular axes generally designated the X and Z axes, and a second cutter head is adapted to be independently displaced along each of two mutually perpendicular axes generally designated the U and W axes. The data which defines the desired path of travel of each of these two cutter heads is prepared by suitable mapping, scanning, or plotting of the desired part geometry as indicated by blocks 10 and 12 in the diagram of FIG. 1. From this individual cutter head displacement path data a so-called manuscript is prepared as indicated in block 14 of FIG. 1. This is normally a document prepared in human-readable form and is ultimately placed in the form of computer-readable cards and the like and fed to a digital processor which, as will be apparent to those skilled in the art, may be implemented in an IBM System/360 computer or the like to translate the machine displacement data into the machine tool or APT language. This is indicated in block 16 of the diagram of FIG. 1. The APT processor block 16 translates the original part program manuscript into machine readable form and is effective to produce a so-called Center Line File 18 which contains data that indicates the parallelism or synchronism which is to be effected as between the two cutter head displacements. From the Center Line File 18 a post processing sequence is begun as will be described in detail hereinafter. The diagram of FIG. 1 up to step 18 is substantially conventional in nature and is used to prepare punched tapes for numerical control applications throughout the industry.

From the Center Line File 18 it is necessary to introduce the machine limitations such as the requirements for tool change, tool size, feedrate, coolant codes, etc. This is accomplished by means of step 20 which is based on the information from the Center Line File 18.

Figure 2:
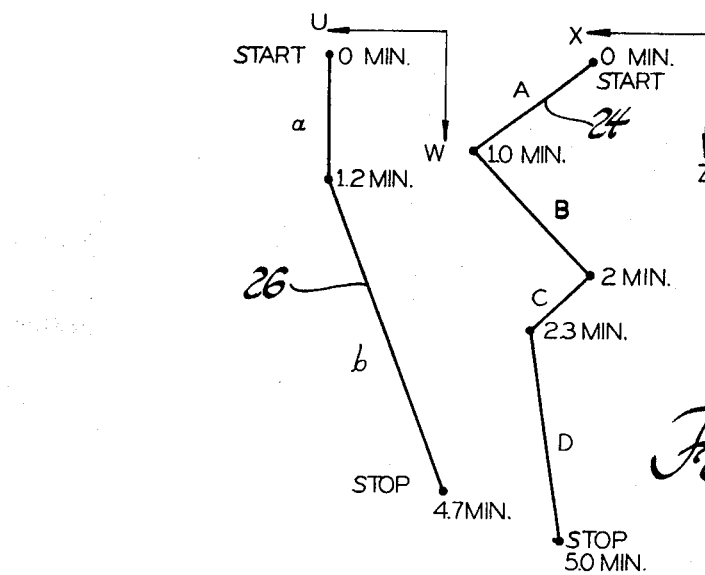
FIG. 2 is a schematic diagram of a pair of desired displacements.

Following the postprocessing step 20, a further postprocessing step 22 is performed to calculate the times required to execute each cutter path segment as, for example, indicated in the drawing of FIG. 2.

Referring briefly to FIG. 2, it will be seen that a first cutter head path 24 comprises segments A, B, C, and D which define the two-dimensional path along the X and Z plane. A second path 26 for the second cutter head contains only segments a and b which lie in the plane defined by the U and W axes. The two paths start, in this instance, from equal Z and W coordinate values and progress toward substantially different coordinate values and pass through substantially different coordinate values along the way to the stop points. The paths may, of course, have unequal Z and W starting values. The steps of block 22 in FIG. 1 involve calculating the times on an absolute scale, that is, from an absolute zero reference point, in which each of the cutter head path segments can be accomplished. From FIG. 2 it will be seen that segment A requires 1 minute to complete. Segment B also requires 1 minute to complete and, thus, the absolute time at the end of the segment B is 2 minutes. Segment C requires only 0.3 minutes to accomplish and thus the absolute time at the end of segment C is 2.3 minutes. Segment D requires 2.7 minutes and, thus, the absolute time at the stop point at path 24 is 5 minutes.

Similarly the segment a of path 26 requires 1.2 minutes to accomplish while the segment b require 3.5 minutes to accomplish. Thus, the absolute time at the stop point for path 26 is 4.7 minutes. A computer program can be easily written to calculate the absolute time values at the end of the various cutter head path segments of paths 24 and 26 from the data generated in step 20 and, thus, it is expected that step 22 is carried out with the aid of a general-purpose digital computer.

From the information calculated in step 22, files are prepared for each of the cutter head paths 24 and 26 as indicated by steps 28 and 30 of FIG. 1. The file may be prepared in any suitable form such as punched cards or other types of computer readout in the normal case. Each file contains the cutter head axis designations followed by the cutter head axis displacement values, followed by the feedrate letter and number, and finally the time for execution, that is, the absolute time at the end of each cutter head segment. The file for the second head is prepared in step 30.

Figure 3:
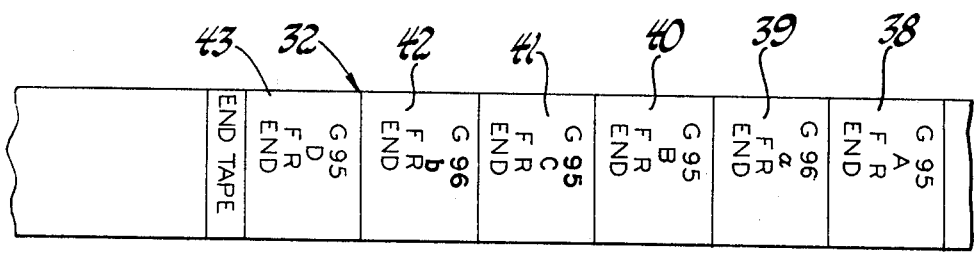
FIG. 3 is a layout of a segment of tape indicating the arrangement of data thereon for carrying out the displacement paths of FIG. 2.

To arrange the cutter head segment information on a tape 32 of the type indicated in FIG. 3 having an extended, aligned plurality of contiguous blocks, the step 34 is carried out to merge and interleave the cutter head segment designators from file 28 and 30 in the order of the absolute time at the end of each cutter head segment as if each path 24 and 26 were run continuously. At this point the information required to control a two-head, two-axis per head machine is contained on a single tape of minimum length and may be operated upon by a single-tape reader to produce synchronized cutter head displacement. From the file which is prepared in step 34 generally on computer cards an offline step 36 is carried out to prepare the tape 32. A standard tape punch is used for this purpose. In addition, a card file may also be prepared for storage as indicated by block 36.

Looking to FIG. 3, a somewhat abbreviated arrangement of data on tape 32 is indicated to accomplish the cutter head path segments of FIG. 2. The tape 32 is divided into a plurality of blocks contiguous with one another and lying in extended alignment along the tape. Each block contains the information required to move one of the cutter heads through a prescribed path at a prescribed rate. All of the tape blocks which pertain to the path 24 in the X and Z plane are preceeded by a block code identified in FIG. 3 as G95. All of the blocks which contain part program data for the path 26 in the U W plane are preceeded with a code designation G96.

In accordance with step block 34 of FIG. 1 the first actual information block to be placed on tape 32 relates to segment A of path 24 since the absolute time at the end of that segment is the lowest absolute time for any segment as between the two paths 24 and 26. Accordingly, block 38 contains at least a G95 code, the X and Z axis designations and the X and Z axis displacement values necessary to define path segments A, a feedrate number and an end-of-block code. The axis designations and axis values are abbreviated in FIG. 3 and simply indicated with the letter A. The block having the next lowest absolute time for completion is block a of path 26. Accordingly, the next block 39 contains a G96 designation, the axis designation and axis values for segment a, a feedrate number and an end-of-block code. The next block 40 contains a G95 designation, the information defining path segment B, a feedrate number and an end-of-block code. Blocks 41, 42, and 43 contain the information defining the path segments b, C, and D in that order since the absolute times at completion of these segments occur in increasing order. The tape is terminated with suitable end of tape and rewind codes as necessary. It will be understood that sequence numbers and other information commonly found on machine tool control tapes may also be inserted in the tape 32 of FIG. 3 but are eliminated from the foregoing description for the sake of brevity.

It is further to be understood that the foregoing description is illustrative in character and is not to be construed in a limiting sense.

The embodiments of the invention in which an exclusive property or privilege is claimed are defined as follows:

1. A method for preparing a single program medium for the control of a given numerically controlled machine having at least two independently movable elements comprising the steps of: defining the discrete segments of each of the two paths through which the elements are to be controllably moved; calculating the absolute time at the completion of each segment of each path if executed by the given machine and, arranging merged machine commands defining the path segments on a program medium in the order of absolute time at the completion of the execution of each segment.

2. The method defined in claim 1 where the arranging step includes a first step of preparing punched cards bearing the segments in said order and a second step of preparing from said cards a punched tape bearing at least substantially equivalent data.

3. The method defined in claim 1 wherein the step of defining includes the steps of preparing a manuscript bearing the path segment data and processing the manuscript to prepare a file in machine tool language.

4. The method defined in claim 1 wherein the commands are arranged in increasing order of absolute time.

5. A method for preparing a single program medium for the simultaneous control of two independently displaceable machine elements comprising the steps of: defining the discrete segments of each of the two paths through which the elements are to be moved; determining the time required to execute each segment of the paths using a given machine; and, arranging merged machine commands defining the path segments on a continuous program medium in the order of increasing absolute time at the completion of the execution of each segment.

6. A method for preparing a single program medium for the simultaneous control of two independently displaceable machine elements comprising the steps of: defining the discrete segments of each of the two paths through which the elements are to be moved; preparing a file defining machine commands for executing each segment; and, arranging merged machine commands defining the path segments on a continuous program medium in the order of increasing absolute time at the completion of the execution of each segment.

* * * * *